March 10, 1970     J. G. WIATT ET AL     3,499,355
HOLD-DOWN APPARATUS FOR MATERIAL CUTTING MACHINE
Filed May 8, 1967     5 Sheets-Sheet 1

INVENTORS
JAMES G. WIATT
& EDWARD C. BRUNS
BY Frank C. Leach Jr.
THEIR ATTORNEY

United States Patent Office 3,499,355
Patented Mar. 10, 1970

3,499,355
HOLD-DOWN APPARATUS FOR MATERIAL
CUTTING MACHINE
James G. Wiatt and Edward C. Bruns, Cincinnati, Ohio, assignors to The Cincinnati Milling Machine Co., Cincinnati, Ohio, a corporation of Ohio
Filed May 8, 1967, Ser. No. 636,968
Int. Cl. B26d 7/06
U.S. Cl. 83—155                                16 Claims

ABSTRACT OF THE DISCLOSURE

A hold-down apparatus for exerting a predetermined downward force on material, which is advanced longitudinally by a pair of endless bands relative to a cutting blade. The cutting blade is moved transversely through a transverse passage between the endless bands. The hold-down apparatus includes a secondary endless band disposed adjacent to the endless passage on each side of the cutting blade and having substantially the same width as the endless band above which it is disposed. The pair of secondary endless bands is supported by suitable means from a shaft, which is supported on a bridge. The bridge supports the cutting blade and is disposed above the transverse passage. A hydraulic cylinder is attached to the shaft to exert a counter-balancing force relative to the mass of the secondary endless bands and their support structure. The force exerted on the material by the secondary endless bands may be varied by varying the counter-balancing force of the hydraulic cylinder.

---

In material cutting machines in which the material is moved longitudinally and transversely relative to the cutting means during cutting of the material, the cutting force of the blade may tend to scoot the material whereby there would be no cutting of the material. This would depend upon the type of material. For example, if a plurality of layers of cloth such as silk were being cut, the relatively low coefficient of friction of the silk would cause the material to scoot relative to the cutting blade because of the cutting force of the cutting blade whereby there would be no cutting of the silk.

Even if the material, which is being cut, was sufficient to prevent scooting thereof due to the cutting force of the cutting blade, there might be some slight shifting of the material with respect to the cutting blade. For example, if a plurality of layers of a fabric such as vinyl was being cut, the cutting force of the blade would not be sufficient to scoot the vinyl but there might be slipping and sliding of the various layers of the vinyl with respect to each other. As a result, the same pattern would not be produced in each of the layers of vinyl.

The desired force to be exerted on the material depends upon the type of material, the thickness of the layers of the material, and the total thickness of the material. Since the material cutting machine must be capable of cutting different types of material with the layers of material having different thicknesses and the total thickness of the material varying, it is necessary to be able to vary the force exerted on the material.

Otherwise, exertion of the same force on the material being cut would have to be a compromise. For example, if a low friction material such as silk were bing employed, a heavy force on the silk might push the silk together to such an extent that the silk might wrinkle or be restricted in its movement past the cutting blade. Likewise, if the force were not sufficient for relatively heavy material with substantial thickness such as vinyl, for example, then undesirable slipping and sliding of layers of the material might occur so that the same pattern would not be produced in each of the layers of material.

The present invention satisfactorily overcomes the foregoing problems by utilizing a hold-down apparatus to exert a predetermined or selected force on the material, which is being cut, adjacent the cutting blade. Thus, the force, which is variable so as to be selected or determined in accordance with the previously mentioned factors concerning the material being cut, is exerted adjacent the area in which the cutting blade exerts its maximum cutting force so as to prevent scooting, sliding, shifting, or the like of the material being cut.

In order to be able to continuously feed material past the cutting blade, for example, it is desirable that the hold-down structure be disposed in spaced relation to the material support means. The present invention satisfactorily meets this requirement by maintaining the hold-down structure, which engages the material, in spaced relation to the material support structure.

An object of this invention is to provide an apparatus to retain material, which is being cut, in a desired relation to the cutting blade during cutting.

Another object of this invention is to provide a hold-down apparatus for exerting a force on material, which is being cut, with the force being predetermined or selected in accordance with the material being cut, the thickness of each of the layers of material being cut, and the total thickness of the material being cut.

Other objects of this invention will be readily perceived from the following description, claims, and drawings.

This invention relates to a cutting machine comprising cutting means. Material, which is to be cut by the cutting means, is supported by means that has a transverse passage therein to receive the cutting means. The cutting machine has means to produce relative movement in a longitudinal direction between the material supporting means and the cutting means to move the material on the material supporting means relative to the cutting means in a longitudinal direction. Relative movement in a transverse direction between the cutting means and the material supporting means is produced by suitable means in coordination with the longitudinal relative moving means whereby the cutting means moves within the transverse passage in the material supporting means to move the cutting means relative to the material in a transverse direction in cutting engagement with the material. Means exert a predetermined force on the material, which is on the material supporting means, adjacent each side of the transverse passage in the material supporting means. The predetermined force, which is exerted on the material by the exerting means, is varied by suitable means.

This invention also relates to an apparatus for exerting a predetermined force on material supported on material supporting means and movable longitudinally and transversely relative to a cutting blade or the like for cutting by the cutting blade. The apparatus includes a pair of means adapted to engage the material and positioned above the material adjacent the cutting blade with the pair of means being disposed on opposite sides of the cutting blade in the longitudinal direction of relative movement of the material and the cutting blade. Each of the pair of material engaging means is maintained a fixed longitudinal distance from the cutting blade by suitable means. Means cooperate with the pair of material engaging means to cause the material engaging means to exert a predetermined force on the material. The apparatus has means to vary the predetermined force, which is exerted by the material engaging means.

The attached drawings illustrate a preferred embodiment of the invention, in which FIGURE 1 is a side elevational view of a material cutting machine utilizing the hold down apparatus of the present invention;

Figure 1:
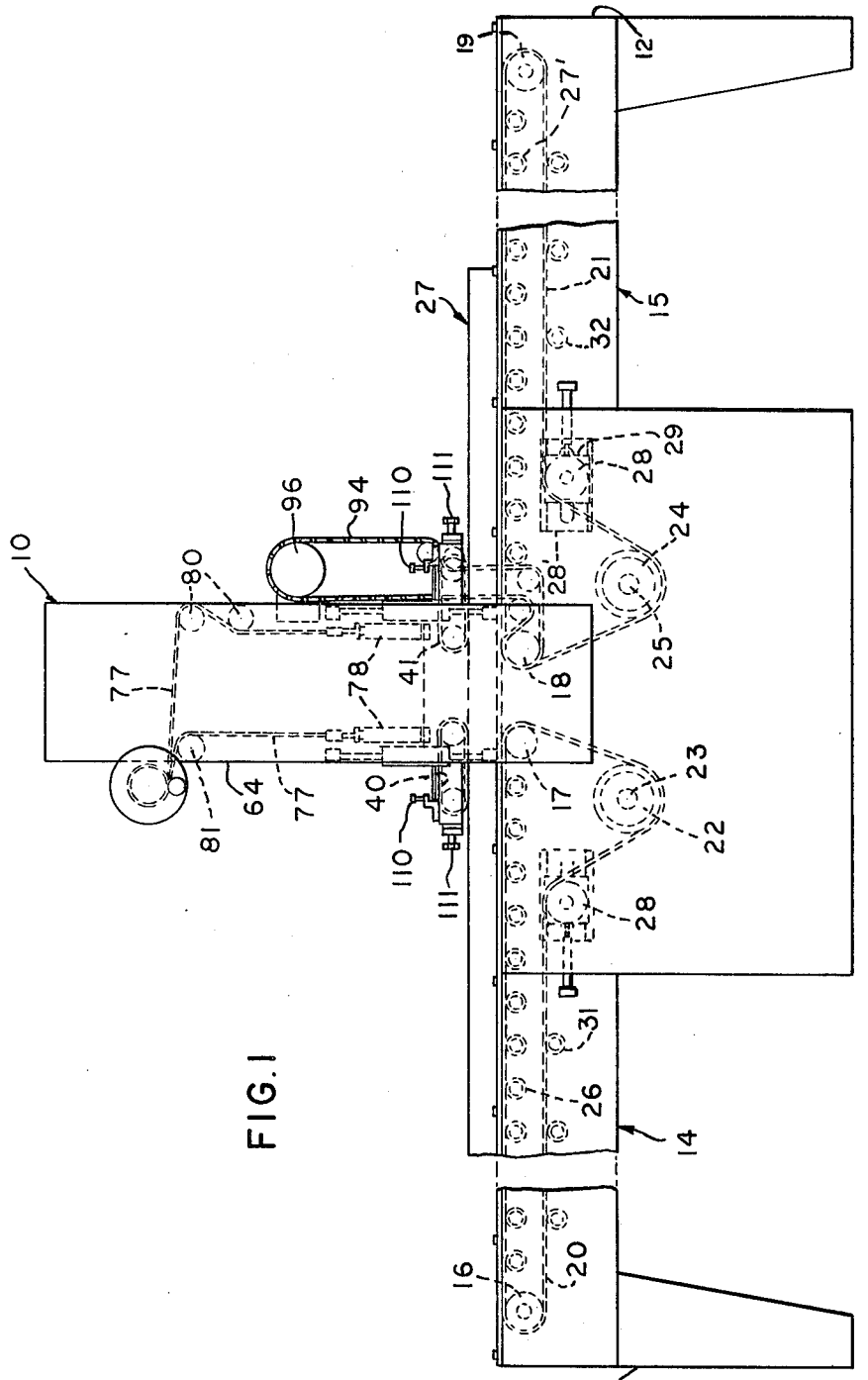

Referring to the drawings and particularly FIGURE 1, there is shown a cutting machine of the type more particularly shown and described in the copending patent application of George W. Sederberg for "Material Cutting Machine Having Reciprocating Cutting Blade," Ser. No. 636,965, filed May 8, 1967, and assigned to the same assignee as the assignee of the present invention. The cutting machine includes stationary support means such as bridge 10 having a table structure extending from each side thereof.

The table structure includes upstanding end members 11 and 12. A pair of side plates 14 (one shown in FIGURE 1) extends from each side of the end member 11 to the bridge 10. A similar pair of side plates 15 (one shown in FIGURE 1 and both shown in FIGURES 2 and 4) extends from the end member 12 to the bridge 10. The side plates 14 are disposed substantially parallel to each other, and the side plates 15 are disposed substantially parallel to each other. Furthermore, one of the side plates 14 is disposed in the same plane as one of the side plates 15 while the other of the side plates 14 is disposed in the same plane as the other of the side plates 15.

Figure 4:
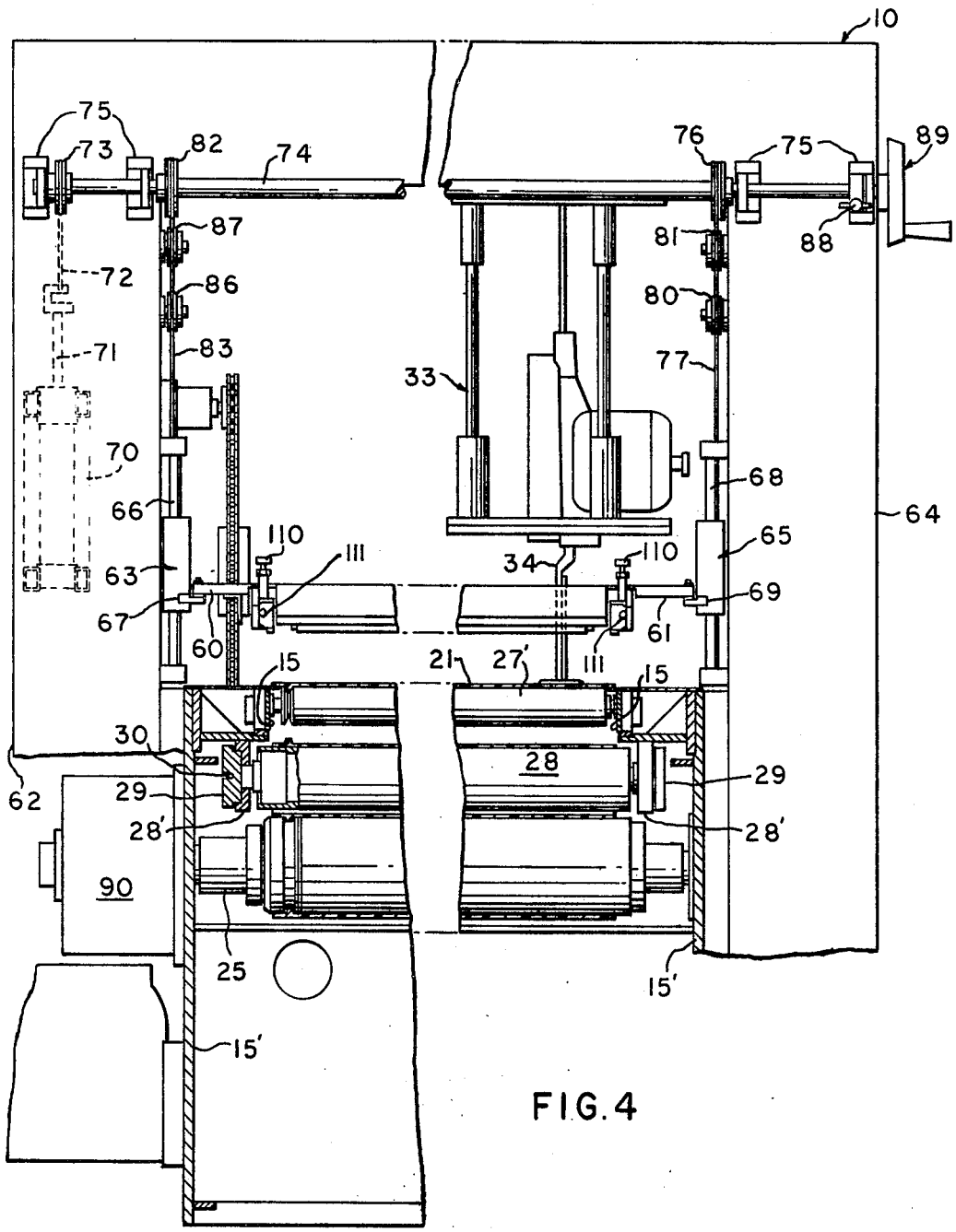
FIGURE 4 is an end elevational view, partly in section, taken from the left side of FIGURE 1 and showing the cutting blade structure.

The side plates 14 and 15 are supported on a box-like structure, which rests on the floor and supports the bridge 10. The box-like structure has side plates or rails 15', which are disposed parallel to the side plates 14 and 15 as shown in FIGURE 4.

A pair of horizontally spaced guide rollers 16 and 17 is rotatably journaled in the pair of side plates 14 and extends therebetween. A similar pair of horizontally spaced guide rollers 18 and 19 is rotatably journaled in the side plates 15 and extends therebetween.

A flexible endless band or belt 20 is passed over the guide rollers 16 and 17 while a similar flexible endless band or belt 21 is passed over the guide rollers 18 and 19. The endless band 20 is driven by a drive roller 22, which is mounted on a drive shaft 23. The endless band 21 is driven by a drive roller 24, which is mounted on a drive shaft 25.

A plurality of horizontally spaced support rollers 26 is journaled in the side plates 14 and extends therebetween for rotation on stationary axes to provide support to the endless band 20 when it supports material 27 such as a plurality of layers of cloth or vinyl, for example, thereon. The endless band 21 is supported by a plurality of horizontally spaced support rollers 27', which are journaled in the side plates 15 and extend therebetween for rotation on stationary axes, to support the material 27 on the endless band 21.

Each of the bands 20 and 21 has a take-up roller 28 for tightening the band, which passes over the take-up roller 28 as shown in FIGURE 1, to permit it to be driven by its drive roller. As shown in FIGURE 4, the take-up roller 28 for the band 21 has opposite ends of its shaft rotatably mounted in longitudinal slots in U-shaped brackets 28', which are fixedly secured to the side plates 15. The shaft of the take-up roller 28 also is rotatably supported in bearing blocks 29, which are longitudinally slidable relative to the U-shaped brackets 28'.

Each of the bearing blocks 29 has a screw 30, which is threadedly connected to the table structure, threadedly attached thereto. Thus, when the screws 30 are rotated, the take-up roller 28 is moved longitudinally to provide the desired tightness to the band with which it cooperates.

Additional support rollers 31 (see FIGURE 1) are journaled in and extend between the side plates 14 for rotation on stationary axes to support the span of the band 20, at any instant, between the bottom of the guide roller 16 and the take-up roller 28. Similar support rollers 32 are journaled in and extend between the side plates 15 for rotation on stationary axes to support the span of the band 21, at any instant, between the bottom of the guide roller 19 and the take-up roller 28.

As shown in FIGURE 4, the bridge 10 supports a cutting blade support structure 33, which is more particularly shown and described in the aforesaid Sederberg application. As set forth in the aforesaid Sederberg application, the cutting blade support structure 33 supports a cutting blade 34 for reciprocating movement thereon. The cutting blade support structure is rotatably mounted on the bridge 10 whereby the cutting blade 34 is rotatable about a vertical axis. The cutting blade support structure 33 is movable transversely of the bridge 10 whereby the cutting blade 34 traverses a transverse passage, which is formed between the spaced endless bands 20 and 21.

The width of the transverse passage is substantially reduced by suitable means (not shown). One suitable structure is shown and described in the copending patent application of Edward C. Bruns for "Gap Closer For Material Cutting Machine," Ser. No. 636,964, filed May 8, 1967, and assigned to the same assignee as the assignee of the present application.

The hold down apparatus includes a pair of secondary, flexible endless bands or belts 40 and 41, which are disposed in vertically spaced relation to the endless bands 20 and 21, respectively. Thus, the endless band 40 is disposed on the same side of the cutting blade 34 as the band 20 while the endless band 41 is positioned on the same side of the cutting blade as the endless band 21.

Figure 3:
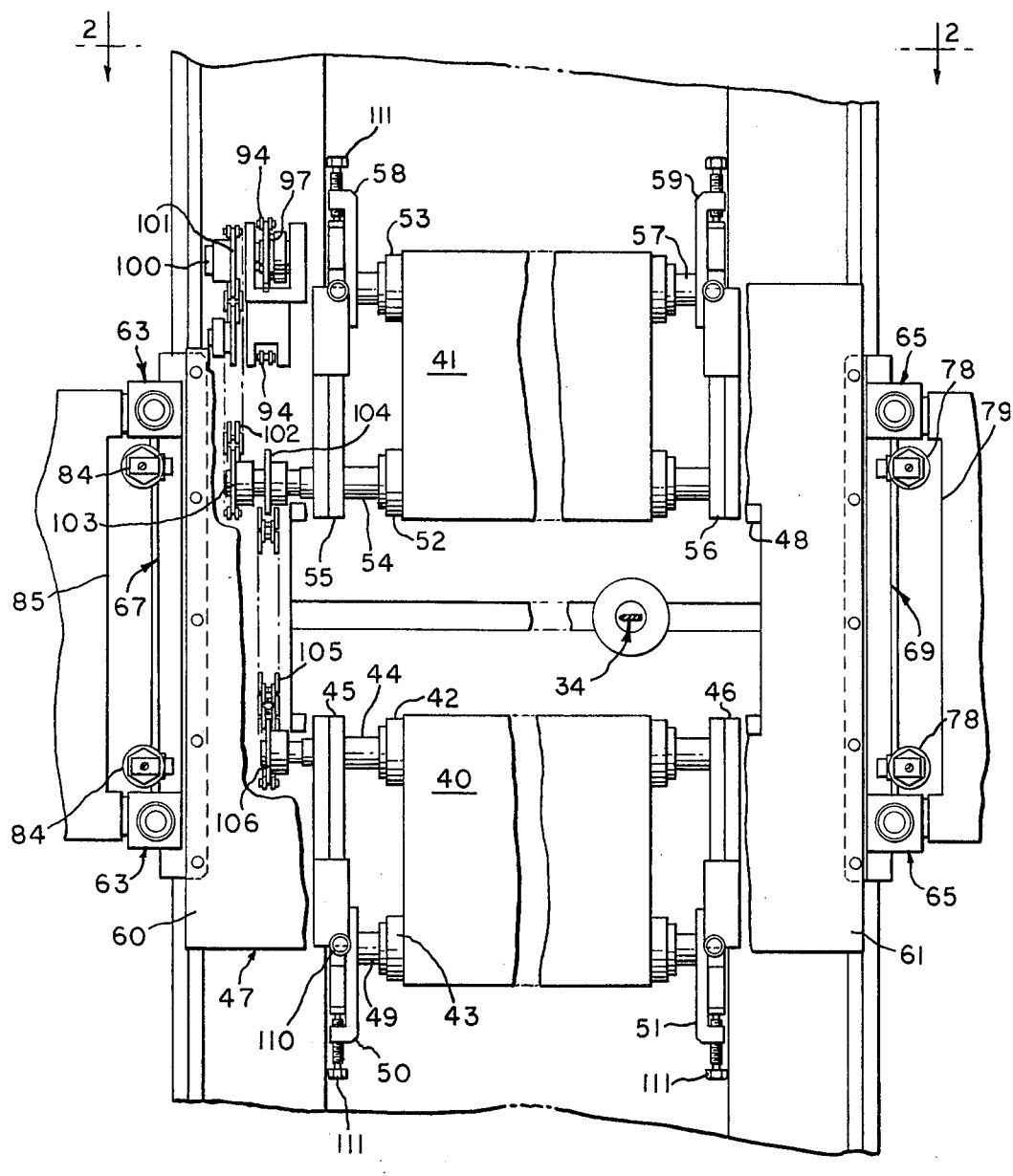
FIGURE 3 is a top plan view, partly in section, showing a portion of the hold down apparatus of the present invention and a portion of the driving structure for the hold-down apparatus.

As shown in FIGURE 3, the endless band 40 extends around a drive roller 42 and a take-up roller 43. The drive roller 42 is secured to a drive shaft 44, which has one end journaled in a bracket 45 and its other end journaled in a bracket 46.

The brackets 45 and 46 are fixedly secured to a cover member 47, which overlies the endless bands 40 and 41. The cover member 47, which supports the endless bands 40 and 41 therefrom, has a rectangular opening 48 therein.

The take-up roller 43 is attached to a shaft 49, which has one end journaled in a bracket 50 and its other end journaled in a bracket 51. The bracket 50 is adjustably movable both vertically and horizontally with respect to the bracket 45 to which it is connected. Similarly, the bracket 51 is horizontally and vertically adjustable with respect to the bracket 46. Thus, both ends of the shaft 49 may be adjusted simultaneously in a vertical or horizontal direction.

Accordingly, the take-up roller 43 may be positioned both horizontally and vertically relative to the drive roller 42 by simultaneously moving the brackets 50 and 51 relative to the brackets 45 and 46, respectively. This not only maintains the endless band 40 taut but also insures desired engagement of the endless band 40 with the material 27.

The endless band 41 extends around a drive roller 52 and a take-up roller 53. The drive roller 52 is attached to a drive shaft 54, which has one end journaled in a bracket 55 and its other end journaled in a bracket 56. The brackets 55 and 56 are fixedly attached to the cover member 47.

The take-up roller 53 is secured to a shaft 57 for rotation therewith. One end of the shaft 57 is journaled in a bracket 58, which is adjustably connected to the bracket 55 for movement of the shaft 57 both vertically and horizontally relative to the shaft 54.

The other end of the shaft 57 is journaled in a bracket

59. The bracket 59 is adjustably connected to the bracket 56 for movement both vertically and horizontally relative thereto whereby the shaft 57 is moved with respect to the drive shaft 54.

Accordingly, the take-up roller 53 may be positioned both horizontally and vertically relative to the drive roller 52 by simultaneously moving the brackets 58 and 59 relative to the brackets 55 and 56, respectively. This not only maintains the endless band 41 taut but also insures desired engagement of the endless band 41 with the material 27.

The cover member 47 includes a flat portion 60 to which the brackets 45 and 55 are fixedly attached and a similar flat portion 61 to which the brackets 46 and 56 are fixedly secured. Accordingly, one side of each of the endless bands 40 and 41 is suported by the flat portion 60 while the other side of the endless bands 40 and 41 is supported by the flat portion 61.

One side of the cover member 47 is supported from an upright support standard 62 (see FIGURES 2 and 4) of the bridge 10 by a pair of vertically disposed ball bearing bushings 63, which are horizontally spaced from each other. The other side of the cover member 47 is supported from an upright support standard 64 (see FIGURES 2 and 4) of the bridge 10 by a pair of vertically disposed ball bearing bushings 65, which are horizontally spaced from each other.

Each of the ball bearing bushings 63 is slidably mounted on a rod 66 (see FIGURES 2 and 4), which is fixed to the standard 62. As shown in FIGURE 3, a support member 67 extends between the ball bearing bushings 63 to connect the ball bearing bushings 63 to each other for movement along the rods 66. The flat portion 60 of the cover member 47 is fixedly secured to the support member 67 by suitable means such as bolts and nuts.

Each of the ball bearing bushings 65 is slidably mounted on a rod 68. Each of the rods 68 is fixedly secured to the upright standard 64 of the bridge 10.

A support member 69 extends between the ball bearing bushings 65 in the same manner as the support member 67 does with respect to the ball bearing bushings 63 to connect the ball bearing bushings 65 to each other for sliding movement along the vertical rods 68. The flat portion 61 of the cover member 47 is fixedly secured to the support member 69 by suitable means such as bolts and nuts.

With the foregoing arrangement, the endless bands 40 and 41 are supported on the bridge 10 for vertical movement relative to the endless bands 20 and 21. A counter-balance structure is employed to maintain the endless bands 40 and 41 at the desired vertical distance from the endless bands 20 and 21. The counter-balance structure also determines the force, which the endless bands 40 and 41 exert on the material 27, since the mass of the bands 40 and 41 and their support structure is much greater than the force, which it is desired to exert upon the material 27 on the endless bands 20 and 21.

The counter-balance structure includes a hydraulic cylinder 70 (see FIGURE 4), which is supported by the upright standard 62 of the bridge 10. The cylinder 70 has its piston rod 71 connected to one end of a cable 72, which has its other end fixedly secured to a pulley 73 on a horizontally disposed shaft 74. The shaft 74 is journaled in bearings 75 on the bridge 10 to permit rotation of the shaft 74 and the pulley 73 with respect to the bridge 10.

The shaft 74 has a pulley 76 mounted thereon for rotation therewith. The pulley 76 has one end of each of a pair of cables 77 fixedly secured thereto. The other end of each of the cables 77 is attached to a shock absorber 78 (see FIGURE 1). Each of the shock absorbers 78 is fixedly secured to a rail 79 (see FIGURE 3), which extends between the ball bearing bushings 65 and is fixedly attached to each of the bushings 65.

As shown in FIGURE 1, one of the cables 77 passes around a pair of vertically spaced rollers 80, which are rotatably mounted on the standard 64 of the bridge 10, for attachment to one of the shock absorbers 78. The other of the cables 77 passes around a single roller 81 (see FIGURES 1 and 4), which is rotatably mounted on the standard 64 of the bridge 10, and is secured to the other of the shock absorbers 78.

Figure 5:
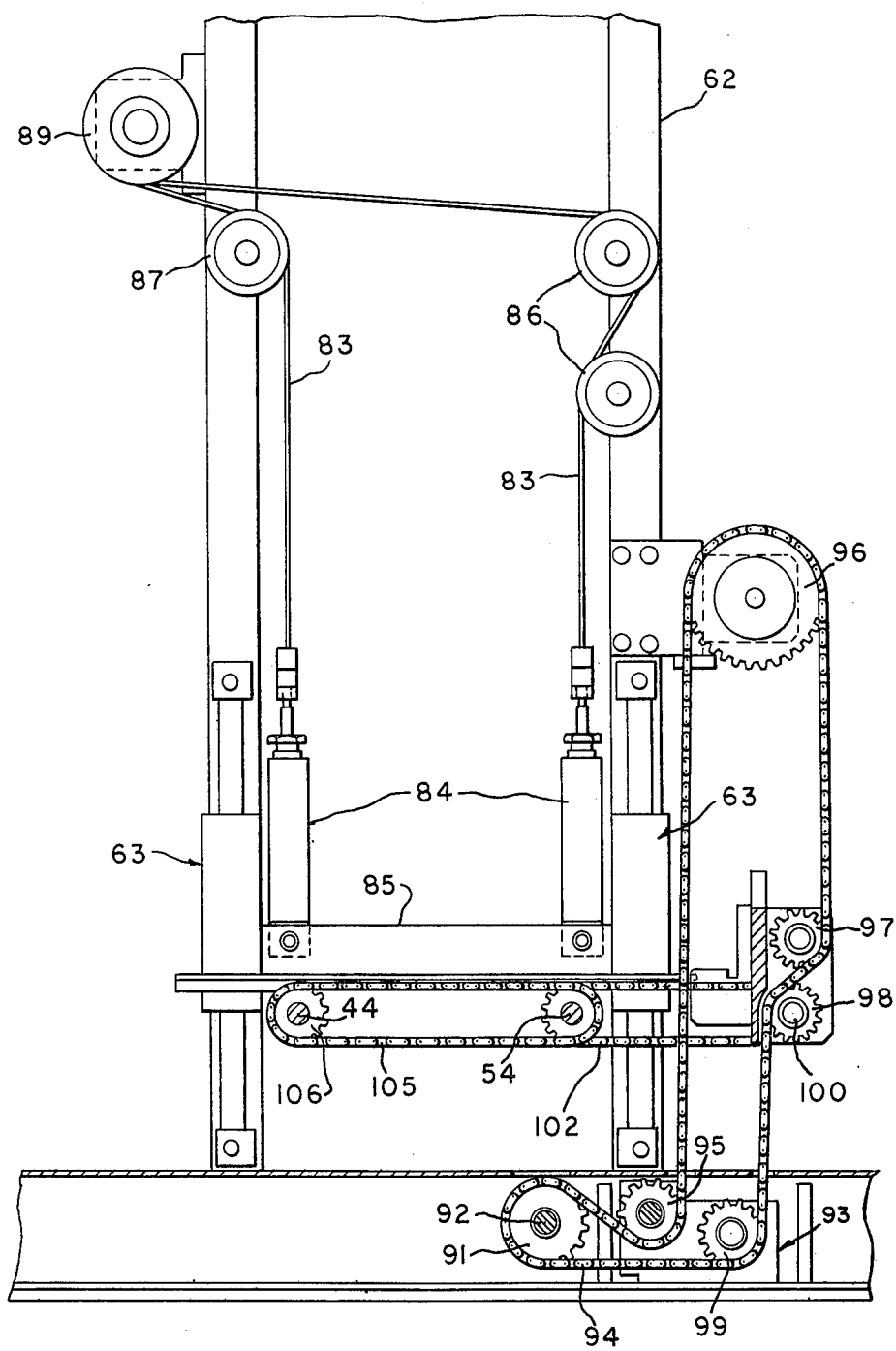
FIGURE 5 is a side elevational view, partly in section, of a portion of the driving structure for the hold-down apparatus and taken along line 5—5 of FIGURE 2.

The shaft 74 has a third pulley 82 fixedly secured thereto for rotation therewith. The pulley 82 has one end of each of a pair of cables 83 secured thereto with the other end of each of the cables 83 connected to a shock absorber 84 (see FIGURE 5). The shock absorbers 84 are connected to a rail 85 (see FIGURES 3 and 5), which is fixedly secured to the ball bearing bushings 63 and extends therebetween. Thus, oscillation of the cover member 47 is prevented by the shock absorbers 78 and 84.

One of the cables 83 passes around a pair of rollers 86, which are rotatably supported on the standard 62 of the bridge 10, for attachment to one of the shock absorbers 84. The rollers 86 are positioned above the endless band 41 as are the rollers 80. The other of the cables 83 passes around a roller 87 (see FIGURES 4 and 5), which is rotatably mounted on the standard 62 of the bridge 10 and is disposed above the endless band 40 as the roller 81 is.

With this arrangement, the cover member 47 is supported from the bridge 10. Furthermore, any force exerted on the shaft 74 by the cylinder 70 counter-balances the mass of the cover member 47 and the connected structure. Thus, the mass of the endless bands 40 and 41, the cover member 47, the ball bearing bushings 63 and 65, and the shock absorbers 78 and 84 must be offset to the desired degree by the force exerted by the cylinder 70.

For example, if the material 27 requires a force of 20 pounds to be exerted thereon as determined by the type of material, the thickness of each layer of the material, and the total thickness of the material and the total mass of the structure, which is suspended from the shaft 74, is 300 pounds, then the hydraulic cylinder 70 must exert a downward force of 280 pounds on the cable 72. When the hydraulic cylinder 70 produces this force on the cable 72, the endless bands 40 and 41 exert the desired force of 20 pounds on the material 27.

Fluid is admitted to each end of the hydraulic cylinder 70 through a check valve (not shown). A variable restrictor (not shown) is placed in parallel with each of the check valves to permit fluid flow from the cylinder. The fluid flow to and from the cylinder 70 is controlled by suitable means (not shown).

The vertical position of the bottom surface or span of each of the endless bands 40 and 41 at any instant with respect to the top surface or span of the endless bands 20 and 21 at any instant must be such that there is no contact therebetween when there is no material on the endless bands 20 and 21. The endless bands 40 and 41 are retrained in a position above the endless bands 20 and 21 through a lock 88 (see FIGURE 4), which engages the shaft 74 to prevent rotation thereof. If the lock 88 were not employed, the mass of the endless bands 40 and 41 and their relative support structure would cause downward movement thereof since this mass is greater than the force exerted by the hydraulic cylinder 70.

In order to control the movement of the endless bands 40 and 41 into engagement with the material 27 on the endless bands 20 and 21 when the lock 88 is unlocked to permit rotation of the shaft 74, a crank 89 is attached to the shaft 74. The crank 89 permits manual control of the endless bands 40 and 41 until their surfaces engage the material 27.

Likewise, if it should be desired to raise the endless bands 40 and 41 from engagement with the material 27 after cutting of the material 27 has been completed and before the material 27 is removed from the endless bands 20 and 21, the crank 89 is rotated to manually lift the bands 40 and 41. Then, the lock 88 is employed to retain the endless bands 40 and 41 in their raised position.

The endless bands 40 and 41 must be driven at the same speed and in the same direction as the endless bands 20 and 21. Accordingly, the velocity of the endless band 40 must be the same as the velocity of the endless band 20, and the velocity of the endless band 41 must be the same as the velocity of the endless band 21. This insures that the endless bands 40 and 41 do not affect the movement of the material 27 by the endless bands 20 and 21.

A motor, which is preferably hydraulic, is disposed within a housing 90 (see FIGURE 4) on one of the side plates 15' and drives both the endless bands 20 and 21 and the endless bands 40 and 41. The motor is connected through gearing to the drive shaft 25. A chain (not shown) connects a sprocket on the drive shaft 25 to a sprocket on the drive shaft 23 whereby both of the drive shafts 23 and 25 are driven at the same speed. Furthermore, the drive shafts 23 and 25 are rotated in the same direction whereby the endless bands 20 and 21 are advanced longitudinally in the same direction.

The guide roller 18, which rotates at the same surface speed as the drive roller 24 because of the endless band 21 being advanced thereover, has a sprocket 91, which is fixedly attached to shaft 92 of the roller 18 for rotation therewith. The shaft 92 (see FIGURE 5) is rotatably mounted in the side plate 15.

A chain 94 passes around the sprocket 91 and around a sprocket 95 (see FIGURE 5), which is rotatably supported by a support structure 93 (see FIGURES 2 and 5), which is fixedly secured to one of the side plates 15'. The chain 94 then passes around a sprocket 96, which is rotatably mounted on the support standard 62. The chain 94 then passes around sprockets 97 and 98 (see FIGURE 5), which are rotatably supported by the cover member 47. The chain 94 returns from the sprocket 98 to the sprocket 91 by passing over a sprocket 99, which also is rotatably mounted on the support structure 93 of one of the side plates 15'.

A shaft 100, which has the sprocket 98 fixed thereto, has a second sprocket 101 (see FIGURES 2 and 3) secured thereto for rotation therewith when the shaft 100 is rotated due to the endless chain 94 driving the sprocket 98. An endless chain 102 (see FIGURES 2, 3, and 5) passes over the second sprocket 101 and meshes with a sprocket 103 (see FIGURE 3), which is fixed to the drive shaft 54. Accordingly, the drive shaft 54 of the endless band 41 is rotated so that the band 41 and the endless bands 20 and 21 have the same surface speed.

The shaft 54 has a second sprocket 104 fixedly secured thereto for rotation therewith. A chain 105 (see FIGURES 3 and 5) meshes with the second sprocket 104 and also meshes with a sprocket 106 on the drive shaft 44. Accordingly, the endless band 40 is driven at the same surface speed as the endless band 41 and the endless bands 20 and 21. Thus, this arrangement insures that the endless bands 40 and 41 do not affect the movement of the material 27 by the endless bands 20 and 21.

Figure 2:
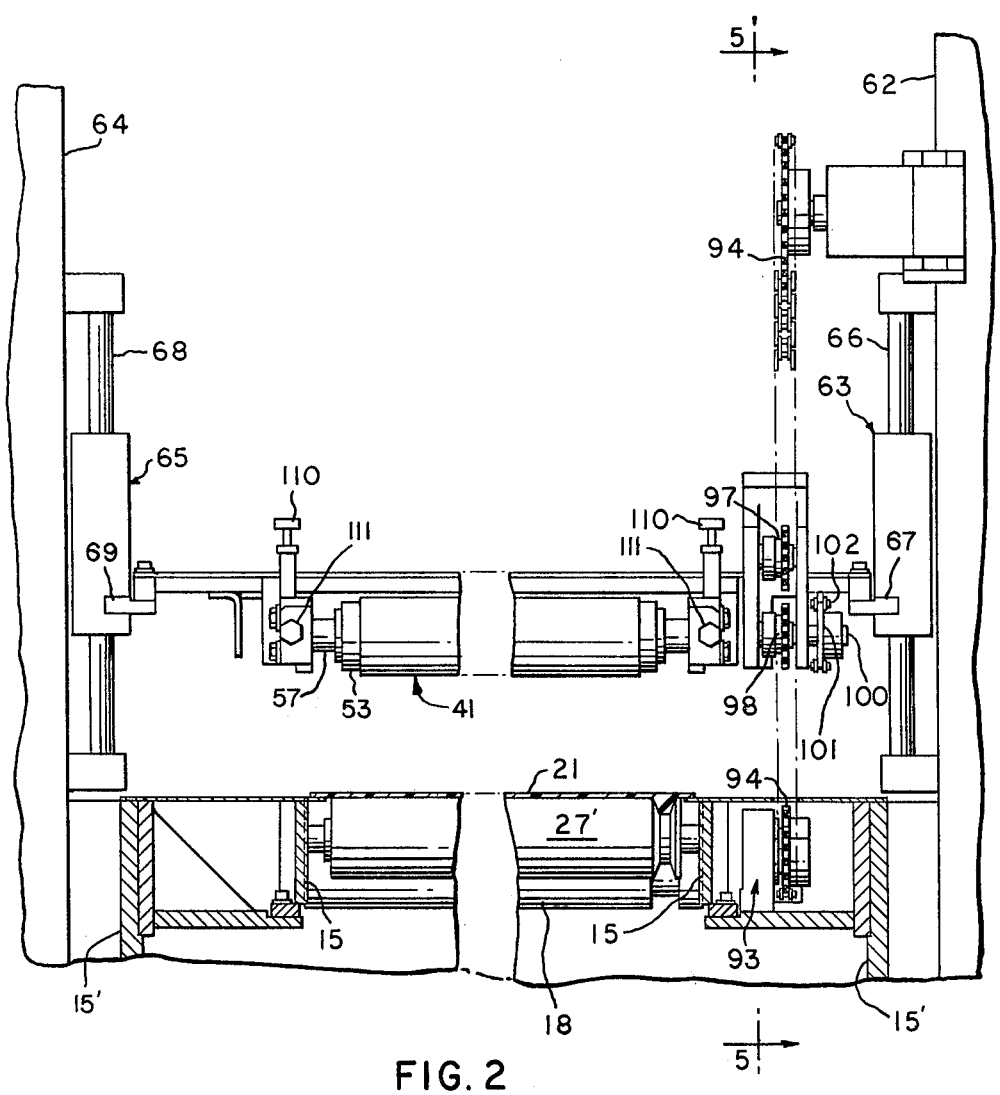
FIGURE 2 is a sectional view, partly in elevation, of a portion of the structure of FIGURE 1 and taken along line 2—2 of FIGURE 3.

As previously mentioned, each of the take-up rollers 43 and 53 of the endless belts 40 and 41, respectively, may be adjusted vertically and horizontally with respect to the drive rollers 42 and 52, respectively. As shown in FIGURE 2, vertical adjustment screws 110 are disposed adjacent each of the take-up shaft 57 of the endless band 41. The screws 110 are supported on the brackets 55 and 56 for vertical movement relative thereto and cooperation with the brackets 58 and 59, whereby the brackets 58 and 59, respectively, may be moved vertically relative to the brackets 55 and 56, respectively.

This results in the axis of the shaft 57 being positioned vertically with respect to the axis of the drive shaft 54. As a result, the surface of the endless band 41, which engages the material 27, may either be disposed horizontal to the material support surface of the bands 20 and 21 or disposed at an angle thereto. Thus, the contact surface of the endless band 41 may be canted with respect to the material support surfaces of the endless bands 20 and 21.

Horizontal adjustment screws 111 are provided for cooperation with the brackets 58 and 59. The horizontal adjustment screws 111, which also are carried by the brackets 55 and 56, cooperate with the brackets 58 and 59 to move the shaft 57 closer to or further away from the shaft 54 whereby the endless band 41 is maintained under the desired tension.

The endless band 40 also has the vertical adjustment screws 110 and the horizontal adjustment screws 111. The same type of relative movement of the take-up shaft 49 with respect to the drive shaft 44 occurs as previously described with respect to the shaft 57 moving relative to the shaft 54.

Thus, the endless bands 40 and 41 may be arranged to have their surfaces, which engage the material 27, disposed horizontal to the material support surfaces of the endless bands 20 and 21. Additionally, each of the endless bands 40 and 41 may be disposed at an angle to the material support surfaces of the endless bands 20 and 21 if desired.

In the operation of the hold down apparatus of the present invention, the material 27 is supported on the endless bands 20 and 21 so that one end of the material 27 is initially disposed for engagement by the cutting blade 34. The lock 88 is unlocked to permit the shaft 74 to rotate, and the endless bands 40 and 41 may be lowered into contact with the top of the material 27 through the crank 89.

Prior to releasing the lock 88, the output force of the hydraulic cylinder 70 is selected in accordance with the type of material to be cut, the thickness of each layer of the material to be cut, and the total thickness of the material being cut. Accordingly, when the endless bands 40 and 41 are moved into engagement with the material 27, the desired hold down force is exerted on the material 27.

It should be understood that the take-up rollers 43 and 53 have their shafts appropriately positioned by the vertical adjustment screws 110 and the horizontal adjustment screws 111. There is no requirement for further adjustment of these screws unless it is desired to change the angular relation of the surfaces of the endless bands 40 and 41 engaging the material 27 or the bands should get out of adjustment.

As shown in FIGURE 2, the width of the endless band 41 is only slightly less than the width of the endless band 21 above which it is disposed. Since the bands 20 and 21 have the same width and the bands 40 and 41 have the same width, the band 40 is only slightly less than the width of the band 20. Therefore, the force exerted on the material 27 is exerted over substantially its entire width since the material 27 will be slightly less than the width of the bands 20 and 21 so as to not be wider than the endless bands 40 and 41.

While the hold down structure of this invention has been described as being utilized with the material cutting machine of the aforesaid Sederberg application, it should be understood that it may be readily employed with any other type of material cutting machine in which there is relative movement between the material and the cutting means. If the longitudinal movement of the material relative to the cutting means should be of the type shown and described in U.S. Patent 3,262,348 to James G. Wiatt et al., it would be necessary to mount the secondary endless bands 40 and 41 of this invention on the carriage, which moves longitudinally relative to the frame.

An advantage of this invention is that a predetermined or selected force is exerted on the material in accordance with the type of material being cut, the thickness of each layer of the material being cut, and the total thickness of the material being cut. Another advantage of this invention is that it prevents any shifting of various layers of material being cut relative to each other to insure that all layers are cut to produce exactly the same pattern thereon. A further advantage of this invention is that the hold down structure is maintained in spaced relation to the material supporting means when there is no material on the material supporting means to prevent damage to the material supporting means.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A cutting machine comprising:
   cutting means;
   means to support material to be cut by said cutting means;
   means to produce relative movement in a longitudinal direction between said material supporting means and said cutting means to move one of the materials on said material supporting means and said cutting means relative to the other in a longitudinal direction;
   means to produce relative movement in a transverse direction between said cutting means and said material supporting means in coordination with said longitudinal relative moving means to move one of said cutting means and the material relative to the other in a transverse direction;
   means to engage the material on said material supporting means adjacent each side of said cutting means;
   and counter-balance means cooperating with said material engaging means to cause a predetermined force to be exerted on the material on said material supporting means by exerting a counter-balancing force to the mass of said material engaging means.

2. The cutting machine according to claim 1 including:
   stationary support means;
   said stationary support means supporting said cutting means for transverse movement;
   said material supporting means including a pair of endless bands longitudinally spaced from each other to form a transverse passage therebetween to receive said cutting means;
   said longitudinal relative moving means including means to drive both of said bands in unison to move the material in a longitudinal direction;
   said material engaging means including:
      a separate, secondary endless band disposed above each of said endless bands of said material supporting means in vertical spaced relation thereto and adjacent to said transverse passage;
      and means on said stationary support means to support each of said secondary endless bands in vertical spaced relation to said adjacent endless band of said material supporting means;
   said counter-balance means cooperating with said support means for said secondary endless bands to cause the predetermined force to be exterted on the material on said endless bands of said material supporting means by exerting a counter-balancing force to the mass of said secondary endless bands and said support means for said secondary endless bands;
   and means cooperating with said longitudinal relative moving means to cause each of said secondary endless bands to be driven at the same velocity as said endless band above which it is disposed.

3. The cutting machine according to claim 2 including means to dispose the material engaging surface of each of said secondary endless bands at an angle to the material engaging surface of said adjacent endless band of said material supporting means.

4. The cutting machine according to claim 2 including means to vary the predetermined force exerted on the material by said material engaging means by varying the counter-balancing force of said counter-balance means.

5. The cutting machine according to claim 2 in which:
   said support means for said secondary endless bands include:
      a shaft rotatably mounted on said stationary support means;
      support means slidably mounted on said stationary support means to support said secondary endless bands;
      and means connecting said slidably mounted support means to said shaft;
   and said counter-balance means includes means connected to said shaft to exert a force in the opposite direction to the mass of said secondary endless bands and said slidably mounted support means for said secondary endless bands.

6. The cutting machine according to claim 5 including means to lock said shaft against rotation to maintain said secondary endless bands in vertical spaced relation to said endless bands of said material supporting means.

7. The cutting machine according to claim 6 including means to manually rotate said shaft.

8. An apparatus for exerting a predetermined force on material supported on material supporting means with the material and a cutting blade or the like being movable longitudinally and transversely relative to each other for cutting of the material by the cutting blade, said apparatus including:
   a pair of means adapted to engage the material and positioned above the material adjacent the cutting blade, said pair of means being disposed on opposite sides of the cutting blade in the longitudinal direction of relative movement of the material and the cutting blade;
   means to maintain each of said pair of material engaging means a fixed longitudinal distance from the cutting blade;
   and counter-balance means cooperating with said material engaging means to cause a predetermined force to be exerted on the material on said material supporting means by exerting a counter-balancing force to the mass of said material engaging means.

9. The apparatus according to claim 8 including means to prevent relative longitudinal and transverse movement between said pair of means and the material.

10. The apparatus according to claim 8 including means to maintain said material engaging means in spaced relation to the material supporting means when no material is disposed on the material supporting means.

11. The apparatus according to claim 8 in which:
   said pair of material engaging means comprises:
      a pair of endless bands;
      and means to drive said endless bands in unison in the direction of relative longitudinal movement of the material supporting means and the cutting blade.

12. The apparatus according to claim 11 including means to maintain said endless bands in spaced relation to the material supporting means when no material is disposed on the material supporting means.

13. The apparatus according to claim 8 including means to vary the predetermined force exerted by said material engaging means by varying the counter-balancing force of said counter-balance means.

14. The cutting machine according to claim 1 including means to vary the predetermined force exerted on the material by said material engaging means by varying the counter-balancing force of said counter-balance means.

15. The cutting machine according to claim 1 in which: said material engaging means includes:
    first and second means disposed on opposite sides of said cutting means in the longitudinal direction of relative movement of the material and said cutting means;
    and means to support said first and second means of said material engaging means in spaced relation to said material supporting means;
and said counter-balance means cooperating with said support means to cause the predetermined force to be exerted on the material on said material supporting means by exerting a counter-balancing force to the mass of said first and second means of said material engaging means and said support means.

16. The cutting machine according to claim 15 in which each of said first and second means of said material engaging means is a separate endless band.

References Cited

UNITED STATES PATENTS

| 2,482,685 | 9/1949 | Moyer. | |
|-----------|--------|--------|---|
| 3,128,660 | 4/1964 | Gaubert | 83—155 |
| 3,285,113 | 11/1966 | Bertoglio | 83—268 X |
| 3,304,820 | 2/1967 | Muller et al. | 83—428 X |
| 3,306,147 | 2/1967 | Goodman | 83—422 X |

JAMES M. MEISTER, Primary Examiner

U.S. Cl. X.R.

83—422, 424, 428

UNITED STATES PATENT OFFICE
CERTIFICATE OF CORRECTION

Patent No. 3,499,355                                        March 10, 1970

James G. Wiatt et al.

It is certified that error appears in the above identified patent and that said Letters Patent are hereby corrected as shown below:

In the heading to the drawings and printed specification, title of invention, "HOLD-DOWN APPARATUS FOR MATERIAL CUTTING MACHINE", each occurrence, should read -- HOLD DOWN APPARATUS FOR MATERIAL CUTTING MACHINE --. Column 1, lines 13, 17 and 18, Column 2, lines 2, 13, 15 and 16, and lines 21 and 22, Column 3, lines 7 and 12, "hold-down", each occurrence, should read -- hold down --. Column 1, line 64, "bing" should read -- being --. Column 6, line 56, "retrained" should read -- retained --. Column 7, line 65, after "each" insert -- end --. Column 9, line 23, "materials" should read -- material --. Column 10, line 9, "include" should read -- includes --.

Signed and sealed this 8th day of December 1970.

(SEAL)
Attest:

EDWARD M. FLETCHER, JR.                             WILLIAM E. SCHUYLER, JR.
Attesting Officer                                         Commissioner of Patents